April 25, 1950     J. FUTTERMAN     2,505,667
HIGH-VOLTAGE PULSE GENERATOR AND CIRCUITS THEREFOR Filed Jan. 25, 1947     2 Sheets—Sheet 1

INVENTOR
JULIUS FUTTERMAN
BY
ATTORNEY

April 25, 1950  J. FUTTERMAN  2,505,667
HIGH-VOLTAGE PULSE GENERATOR AND CIRCUITS THEREFOR
Filed Jan. 25, 1947  2 Sheets-Sheet 2

INVENTOR
JULIUS FUTTERMAN
BY
ATTORNEY

Patented Apr. 25, 1950

2,505,667

UNITED STATES PATENT OFFICE 2,505,667

HIGH-VOLTAGE PULSE GENERATOR AND CIRCUITS THEREFOR

Julius Futterman, New York, N. Y., assignor of one-half to Joseph C. Ehrlich, New York, N. Y.

Application January 25, 1947, Serial No. 724,334

2 Claims. (Cl. 315—241)

The present invention relates to the art including electronic circuits for producing and utilizing high-voltage pulses, and more particularly to such circuits operated from battery or other low-voltage sources.

According to one feature of the invention, an extremely simple, light, and compact pulse generator is provided, adapted to be operated from readily portable batteries to produce high-amplitude voltage pulses.

According to another feature of the present invention, a highly efficient and readily portable high direct-voltage source is provided, excited only by low-voltage low-drain batteries, and useful, for example, as a megohmmeter.

As a further feature of the present invention, a simple, inexpensive and conveniently portable repeater flash lamp is provided, useful for photographic or other purposes, and providing readily controllable high intensity light flashes, repeatable at will very many times.

As still a further feature of the present invention, a simple and novel starter and exciter for continuous high intensity arc lamps is provided which is very inexpensive to construct and operate, and which may be excited either from alternating current or direct current sources.

Accordingly, it is a major object of the present invention to provide a novel and simple high-voltage pulse generator excited from relatively low-voltage sources and of wide utility, especially where portable high-voltage sources are required.

It is a further object of the present invention to provide an improved and novel apparatus for converting low direct voltage to high direct voltage, without sacrificing portability and with high efficiency.

It is still another object of the present invention to provide improved and novel exciter apparatus for flash or arc lamps utilizing my novel pulse generator circuit.

Other objects and advantages of my invention will become apparent from the following detailed description and the appended drawings, in which Fig. 1 is a schematic circuit diagram of my novel pulse generator.

Figure 1:
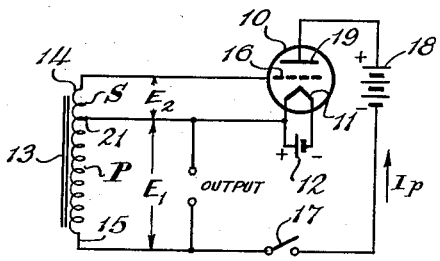

Figure 1 shows a schematic wiring diagram of one form of the pulse generator of the present invention. This generator comprises a thermionic tube 10 which, for portability, is shown as being of the directly heated type having a filament or filamentary cathode 11 energized from an A-battery 12. Tube 10 is shown as a triode having a control grid 16 and an anode or plate 19, but it will be understood that the principles of the invention may be practiced with many other forms of amplifier tube, including tetrodes, pentodes, etc. A suitable form of tube has been found to be the type 1LE3 which is a directly heated triode having a 1.4 volt, 50 milliampere filament, and operating satisfactorily with 67.5 or 90 volt B-batteries.

A high Q, low loss, iron-cored coil 13 has one end 14 connected to control grid 16, while the other end 15 of coil 13 is connected in series with switch 17 and B-battery 18 directly to plate 19. An intermediate tap 21 of coil 13 is connected to the positive leg of filament 11.

Figure 2:
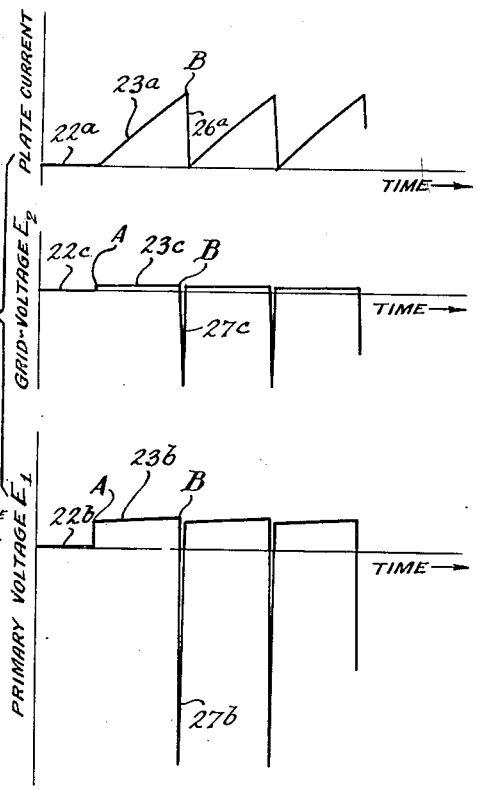
Fig. 2 is a series of current and voltage waveform curves useful in explaining the operation of my invention.

This extremely simple circuit has produced voltage pulses of extremely high amplitude of the order of 2000 to 4000 volts, from an ordinary B-battery of 67.5 or 90 volts. The following explanation, referring to Figs. 1 and 2, is believed to represent the correct explanation of the theory of operation of my improved pulse-generating circuit. The curves of Fig. 2 represent the plate current I and the coil 13 primary and secondary voltages $E_1$ and $E_2$ as functions of time.

In these curves, $E_1$ is taken as positive when filament 11 is positive with respect to coil terminal 15, and $E_2$ is positive when grid 16 is positive relative to filament 11.

Assuming that filament 11 is being heated by battery 12, and that switch 17 is open, then obviously no plate current will flow, as indicated by portion 22a, 22b, 22c of the curves of Fig. 2. Switch 17 is now closed, thereby permitting plate current I to flow under the influence of the electromotive force of battery 18. However, since battery 18 is connected across the series inductance-resistance circuit provided by the inductance of the primary section P of coil 13 and the internal resistance of tube 11, in accordance with accepted circuit theory, the current should rise in an exponential manner, if the resistance remained constant. However, due to changing grid voltage, the resistance of tube 10 is not constant, and hence the plate current rises in a substantially linear manner, as shown by curve 23a of Fig. 2.

The primary voltage $E_1$ is given both by the time rate of change of current I and by the difference between the battery voltage and the IR drop in the tube resistance. This primary voltage initially rises steeply to a value shown at A in Fig. 2, and then slowly increases with a very small slope as shown at 23b. The substantially linear current increase 23a is thus accompanied by an almost constant primary induced voltage 23b.

The secondary voltage $E_2$ is of course proportional to the induced primary voltage $E_1$, and thus has a similar wave form as at 23c. Since voltage $E_2$ provides the sole bias for grid 16, grid 16 remains positively biased and permits continued plate current rise for a time. However, the plate current cannot increase indefinitely; due to the combined effects of grid current and plate current, a condition of current saturation is reached, where even further increase of positive grid bias cannot further increase the plate current. As the plate current stops increasing, both the primary and secondary induced voltages drop to zero. This makes the grid more negative which reduces the plate current. The decrease of plate current reverses the polarity of the secondary voltage $E_2$ and thus cuts off the plate current completely.

Once this action is started, upon $E_2$ attaining the critical value (shown by point B) at which the increase in plate current is slowed down, the action is cumulative and regenerative, to produce an extremely quick current cut-off, equivalent to rapidly opening a switch. In view of this rapid decrease of current, shown at 26a in Fig. 2, an extremely large negative voltage pulse is developed across coil 13, as shown at 27b, 27c. This voltage pulse has been found to be many times larger in amplitude than the voltage of battery 18. For example, with a battery voltage of 67 to 90 volts, pulses having amplitudes from 1000 to 4000 volts have been obtained.

These pulses 27b are of very short duration, and the voltages $E_1$ and $E_2$ return to zero quickly, since tube 11 is completely cut off. However, as the voltage $E_2$ returns to zero, tube 10 begins to conduct, since it is conductive for zero bias. Hence the cycle just described starts all over again, and repeats itself periodically to produce periodic high intensity voltage pulses.

The frequency of these pulses is controlled by the inductance of the transformer or coil 13, the plate resistance of tube 10, and the voltage of "B" battery 18. An increase in battery voltage decreases the frequency. A decrease in tube resistance, as by substituting other tube types or by placing tubes in parallel, also reduces frequency. In normal operation, frequencies from about 100 to 1500 pulses per second are encountered. In a representative circuit where the primary coil had an inductance of 5.36 henries and a Q of 26, the secondary coil had an inductance of 0.07 henry and a Q of 7.5, and with a turn ratio of about 10.25 to 1, the frequency was from 1000 to 1500 at a battery voltage of 90 volts. The pulse voltage was around 1500 volts under these conditions.

The intensity of the pulses 27b depends upon the interrelation between battery voltage, tube amplification factor, and the ratio of primary to secondary turns of coil 13. Too high a turn ratio has been found to prevent pulse generation completely. As the turn ratio is decreased, the pulse amplitude decreases, and the oscillations approach the sinusoidal type produced by a regenerative oscillator. For best results, the turn ratio is selected just below the "cut-off" value, so that the above-described relaxation oscillations with high intensity pulses are produced. For the 1LE3 tube at 90 volts, the primary to secondary turn ratio should be about 10 to 1.

Another critical factor has been found to be the resistance in the grid-filament circuit. For best efficiency this resistance should be as low as possible so that coil 13, at least between terminals 14 and 21, is of low resistance, and these terminals are directly coupled to grid and filament. Even a relatively small resistance has been found to decrease the pulse amplitude and conversion efficiency, while a resistance in the neighborhood of only 3000 ohms may stop pulse production entirely.

Output terminals for feeding the produced pulses to external apparatus may be connected in several different ways, so long as the primary winding is coupled between them. Thus the following combinations are possible: (1) between point 15 and filament; (2) between point 15 and grid; (3) between filament and anode; (4) between grid and anode. Of these, (2) and (4) produce highest pulse intensity, which is only slightly higher than (1) or (3). (3) and (4) include the battery voltage, and are useful where this is desirable.

The high voltage pulses produced by my novel circuit may be applied wherever such pulses are found useful. In particular, they may be rectified to produce a high direct voltage. In this way my invention is useful as a direct current converter, and is especially useful as a very light, compact and portable source of high voltages of from 1000 to 4000 volts, since the only power source required is supplied by a small A-battery (1.5 volts) and a small B-battery (67.5–135 volts).

Figure 3:
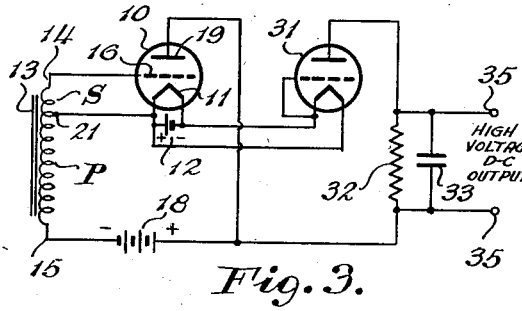
Fig. 3 is a schematic circuit diagram of my novel direct-voltage step-up converter, incorporating a circuit similar to that of Fig. 1.

Fig. 3 shows such a portable high voltage source, using the pulse generator of Fig. 1. Connected in series between filament 11 and anode 19 are a rectifier tube 31 and a load resistor 32 by-passed by a condenser 33. Rectifier tube 31 is preferably of the same type as tube 10, with low filament drain. The grid of rectifier 31 is tied to its filament to avoid breakdown between the closely spaced grid and filament, due to the high voltage pulses. However, a diode rectifier may also be used here. The time constant of resistor 32 and condenser 33 is made high enough so that, after only a short charge-up time, condenser 33 is charged to substantially the peak amplitude of the voltage pulses.

A converter of this type has a very high conversion efficiency from low voltage to high voltage. Under the conditions described with respect to Fig. 1, the circuit of Fig. 3 has produced conversion efficiencies greater than 50%; that is, over 50% of the 90-volt power from battery 18 was converted to high-voltage power derivable at output terminals 35.

Figure 4:
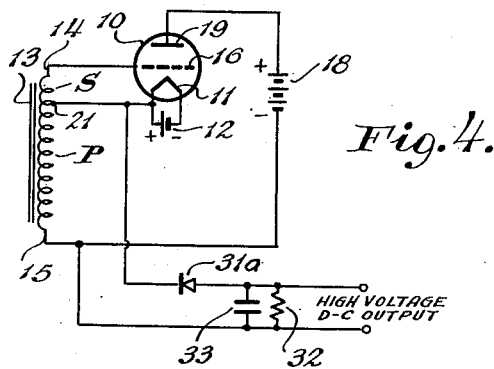
Figs. 4 and 5 are circuit diagrams of minor modifications of the circuit of Fig. 3.
Figure 5:
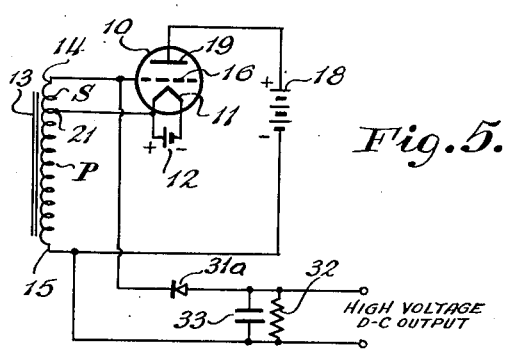

It will be understood that, where desirable, the resistance 32 may be provided by a load coupled to terminals 35. It will also be understood that my invention is not limited to the particular type of rectifier shown, since other types may also be used with equal or greater effectiveness. In particular, so-called "dry" rectifiers, such as of the selenium or copper-oxide type, may also be used, as shown in Fig. 4, where dry rectifier 31a is used. In this case output connection (1) is used, the rectifier 31a and its load resistor 32 being coupled between filament 11 and the end 15 of coil 13. Fig. 5 shows a similar circuit, using connection (2), described above, between grid and coil end 15. Of course, the other connections (3) and (4) can also be used.

It is to be noted that a single duplex tube, including both amplifier and diode sections, may be used instead of separate amplifier 10 and rectifier 31 or 31a, with proper tube design to avoid breakdown between cathode and diode anode due to the high pulse amplitudes.

Figure 6:
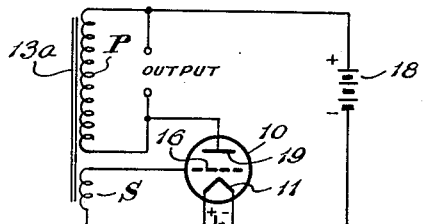
Fig. 6 is a circuit diagram of another embodiment of pulse generator, similar to Fig. 1.

In the above embodiments of my invention, a single tapped coil 13 has been illustrated, used in a circuit similar to an auto-transformer. However, it will be apparent that a regular two-winding transformer can be used equally well, as shown in Fig. 6, which shows the pulse generator circuit of Fig. 1 with a transformer 13a having a primary winding P and a secondary winding S substituted for the corresponding windings of coil 13. Such an arrangement avoids the necessity of coupling the filament directly to both primary and secondary, as is exemplified in Fig. 6. It will be understood that the secondary winding terminals are connected to the grid and filament in the proper order to produce the action described above with respect to Fig. 1.

Output is derived in Fig. 6 as in Fig. 1, from any of several pairs of output terminals. One pair is shown in Fig. 6, coupled across primary P. These terminals could also be coupled between anode and filament or between anode and grid.

The pulse generating circuits of Figs. 1 and 6 are of course capable of other uses. In particular, by supplying a synchronizing or control pulse wave to the grid or plate, the frequency of the pulses produced by these circuits can be "locked-in" or synchronized with the control wave. Since the plate current is nearly a linear saw-tooth wave, this produces a synchronized saw-tooth wave useful for many purposes, such as in television.

Figure 7:
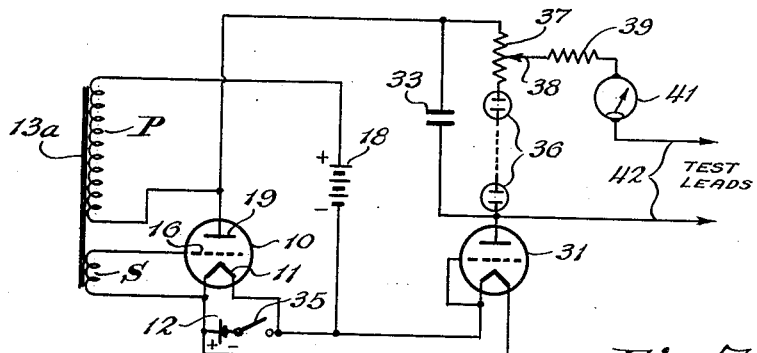
Fig. 7 is a schematic circuit diagram of my improved megohmmeter utilizing the principles of the preceding figures.

Fig. 7 shows the application of my novel pulse generator and high voltage D.-C. source in a portable megohmmeter. The pulse generator in this figure is the same as in Fig. 6, with output taken from between anode and filament and applied to rectifier 31 in series with a load resistance comprising a plurality of series-connected voltage stabilizing lamps 36 in series with a small zero-adjusting potentiometer 37, both by-passed by condenser 33. Lamps 36 may be 1/25 watt neon lamps, which have a stabilizing voltage of about 65–70 volts. Enough lamps are connected in series to provide a desired output voltage, such as 500 volts, suitable for megohmmeter use. The tap 38 of potentiometer 37 is connected in series with a calibrating resistor 39 and microammeter 41 to one test lead 42, the other lead 42 being connected to the anode of rectifier 31.

In use, test leads 42 are shorted together and tap 38 is varied until meter 41 reads full scale (corresponding to zero resistance across test leads 42). Then, with proper calibration of meter 41, it will indicate directly the resistance of any circuit element connected to leads 42. In view of the high voltage produced, very high resistances can be measured, in the megohm range, while retaining all the advantages of portability and compactness characteristic of low-resistance ohmmeters.

Figure 8:
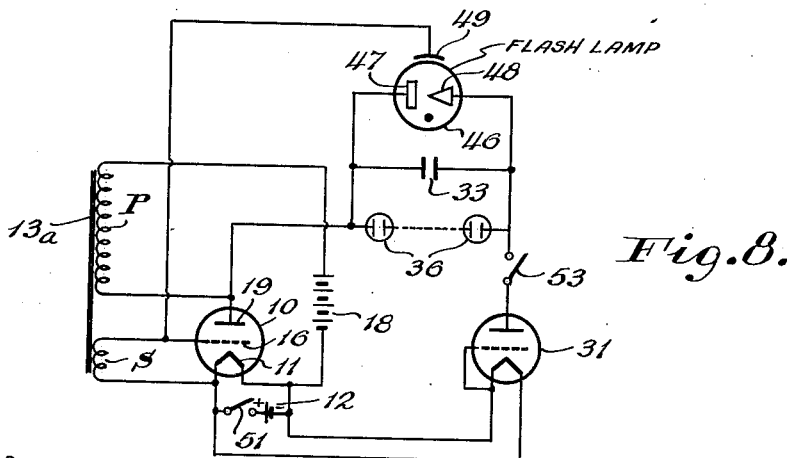
Fig. 8 is a schematic circuit diagram of my improved flash lamp exciter.

Fig. 8 shows this same circuit applied to control a photographic flash lamp. In the photographic field there is great need for a simple and portable flash lamp capable of producing readily controllable, repeatable, short, intense flashes of light by which photographs may be taken, without the necessity of replacing a flash bulb after each picture. Flash lamps suitable for this purpose are now commercially available (one form being known as the Sylvania type R4330 lamp), but the portable power supplies for these lamps are presently very cumbersome and weighty affairs, hardly practicable for convenient portable use. However, by the use of the present invention, a very simple flash unit is provided, which is very compact and weighs only a few pounds, including batteries.

The type R4330 lamp requires a main discharge voltage of approximately 2000 volts plus an ignition voltage of about 4000 volts. Both these voltages can be readily provided in a simple and novel manner by the use of the circuit of Fig. 8, incorporating my novel pulse generator and high voltage source. In Fig. 8, the same pulse generator and rectifier circuit are shown as in Fig. 7. However, the voltage stabilizing lamps 36 are now selected to provide about 2000 volts output, and a 2500 volt condenser 33 of suitable capacitance, such as 10 microfarads or higher, is connected thereacross.

The flash lamp 46 includes a pair of main discharge electrodes 47, 48 connected across condenser 33, and an igniting electrode 49 connected to grid 16 of tube 10.

A switch 51 is connected in series with A-battery 12 and serves as a master switch, since no current can flow in any part of the circuit when switch 51 is open.

A second switch 53 is connected between the anode of rectifier 31 and condenser 33, and serves as a flash control switch. It will be understood that in actual use switch 53 is synchronized with the camera shutter release, in well-known manner.

In operation, flash-control switch 53 is normally closed. Hence, when main switch is first closed, the pulse generator operates as described above to produce high voltage pulses of the order of 4000 volts in amplitude. These pulses are rectified by rectifier 31 and charge up condenser 33. However, due to the shunting effect of stabilizing lamps 36, the voltage across condenser 33 reaches only about 2000 volts in a few seconds and then remains at that value. The switch 51 is normally closed about 15 seconds before the flash is desired, to permit condenser 33 to reach full charge. If desired, switch 53 may be a normally closed, momentary-open, type of switch.

It will be noted that condenser 33 is connected directly across the main electrodes of flash tube 46, but is of insufficient voltage to initiate the discharge therein to produce the flash of light. For initiating the flash, switch 53 is opened. By so doing, the full pulse amplitude of 4000 volts is impressed between igniting electrode 49 and main electrode 47, where previously only about 2000 volts had been impressed. This increase in potential of electrode 49 starts the main discharge between electrodes 47 and 48, which is raised to high intensity, producing a very intense light flash, by the discharge of condenser 33 through the flash tube 46.

After the flash is produced, switch 53 is closed again, permitting condenser 33 to recharge for the next flash. In this way readily controllable intense flashes are produced exactly when desired, by the use of a very light, compact and portable apparatus. These flashes can be repeated many times without serious drain on the batteries, due to the remarkable efficiency of the voltage conversion, which is in the neighborhood of 50%.

While a major feature of the present invention is its extreme simplicity and lightness, making it extremely portable, the basic principles are also adapted for use from power lines rather than with batteries. Such a further use of my invention is shown in Fig. 9, which shows the invention adapted for use to control an arc lamp from D.-C. or A.-C. power mains.

Figure 9:
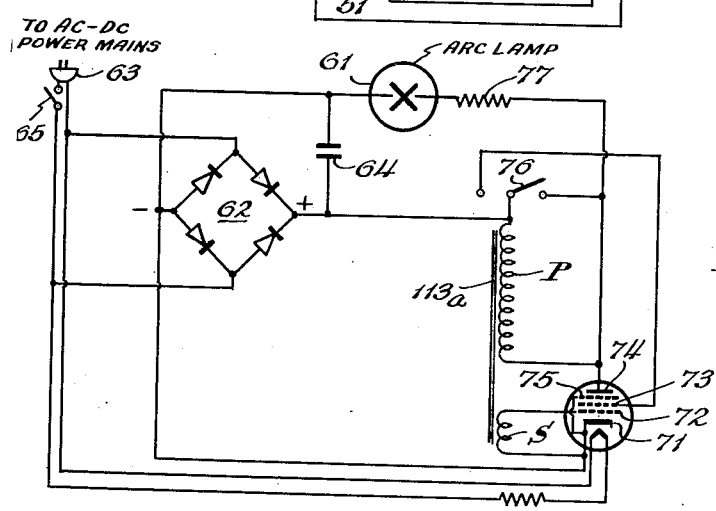
Fig. 9 is a schematic circuit diagram of my improved arc lamp exciter and starter.

In Fig. 9 is shown schematically an arc lamp 61 which, for example, may have a 25 watt rating requiring 40 volts during continuous excitation, but which may require as much as 1000 to 2000 volts for starting. The circuit of Fig. 9 provides a very simple power supply for both starting and running such a lamp, from either A.-C. or D.-C. mains.

The essence of the circuit of Fig. 9 is a pulse generator similar to that described above. However, in this circuit, for reasons given below, it is desirable to use a transformer 13a with very low resistance primary, preferably having low turn ratio. To obtain the advantages of the present invention with a lowered turn-ratio it is necessary to use a tube having a high amplification factor, such as a pentode tube 10a.

A bridge-type rectifier 62 is coupled to the power mains by the plug 63 through the main power switch 65 and has a filter condenser 64 connected across its output. The negative terminal of rectifier 62 is connected to cathode 71 of pentode 10a. The positive terminal of rectifier 62 is connected through primary winding P to pentode plate 74. Secondary winding S is connected between cathode 71 and control grid 72. Suppressor grid 75 is connected directly to cathode 71 in conventional manner.

A single-pole double-throw switch 76 has its movable arm connected to the positive rectifier terminal and primary P, while the left switch terminal is connected to screen grid 73 and the right switch terminal is connected to plate 74. Arc lamp 61 has one terminal connected to the negative rectifier terminal while the other terminal is connected through current-limiting resistor 77 to plate 74.

Switch 76 is normally connected in the right-hand position, where arc lamp 61 is connected directly across rectifier 62, in its "running" condition. In this switch position, primary winding P is short-circuited, and no potential is applied to screen grid 75, rendering the pulse generator inoperative. However, for starting or restarting lamp 61, switch 76 is momentarily moved to the left-hand position, thus unshorting primary winding P and inserting it in series with arc lamp 61. Simultaneously screen grid 73 is energized from the positive rectifier terminal, and tube 10a operates to produce high voltage pulses which ignite lamp 61. Sufficient current then flows from rectifier 62 through primary P to maintain lamp 61 illuminated. Upon returning switch 76 to the right-hand position, primary P is shorted out and lamp 61 is restored to full brilliance. Preferably switch 76 is of the type which is normally biased to the right-hand position, and is depressed to put it into the left-hand position; upon release it returns to the right position automatically. In this way, the pulse generator is continually ready to start or restart lamp 61, merely by actuating switch 76.

It will be apparent that the circuit of Fig. 9 is adapted for use either from A.-C. or D.-C. mains, since rectifier 62 offers only slight volt drop for D.-C. operation, which is immaterial to the operation of my novel pulse generator.

In each of the above embodiments of my invention, it will be understood that several tubes may be connected in parallel if it is believed desirable to increase the high-voltage power output or to increase the charging rate of condenser 33 in Figs. 7 or 8.

Many other minor modifications of the above-described circuits are, of course, possible. For example, in Fig. 8, the starting electrode 49 could be connected directly to filament 11 instead of to control grid 16, if desired. Also, as mentioned above, tube 31 could be replaced by a dry rectifier similar to 31a of Figs. 4 and 5. When using such a dry rectifier 31a in the circuit of Fig. 8, other arrangements of rectifier, switch 53, and the combination of flash lamp 46 and condenser 53 are, of course, possible. For example, in one particular form, the same pulse generator circuit as shown in Fig. 8 or Fig. 6 can be used, and a series arrangement of condenser 33, a dry rectifier 31a and switch 53 is connected, in that order, between the common terminal of batteries 12 and 18 at one end and the plate 19 at the other end. It will be understood that stabilizing lamps 36 and the flash lamp 46 are connected in parallel with the condenser 33 as in Fig. 8. In addition, the starting electrode 49 is connected directly to the plate 19. This circuit provides the advantage that one terminal of the condenser and of the flash lamp is connected to the negative terminal of B-battery 18, which is normally grounded.

Other arrangements of the circuit are, of course, possible so long as, while switch 53 is closed, condenser 33 is charged to the limiting voltage determined by stabilizing lamps 36, which voltage is applied across the principal electrodes 47, 48, and, upon opening switch 53, this charging circuit is interrupted and the maximum pulse voltage produced by the pulse generator circuit is applied between starting electrode 49 and one of the principal electrodes 47, 48. Other minor modifications will, of course, occur to persons skilled in the art.

Thus I have described an extremely simple, compact and light-weight circuit adapted for portable use as a pulse generator as a low-voltage to high-voltage converter, as a megohmmeter, as a flash lamp power supply, as an arc lamp starter. However, it will be understood that many other embodiments of the invention are possible all utilizing its basic principles, so that the foregoing description is to be taken as illustrative only, and not in a limiting sense.

I claim as my invention:

1. Flash lamp apparatus comprising a flash lamp having a pair of principal electrodes and a starting electrode, and circuit means for igniting and flashing said lamp, said circuit means comprising a vacuum tube having a grid, a cathode and an anode, a source of direct current, a primary coil connected in series with said source between said cathode and anode, a secondary coil connected directly between said grid and cathode, said coils being closely magnetically coupled and having a high primary-to-secondary turn ratio, a series connection of a rectifier and a load circuit therefor connected across said primary coil, said principal flash lamp electrodes being connected across said load circuit, means connecting said starting electrode to said cathode, and a switch in said series connection, whereby when said switch is closed a high direct voltage appears across said load circuit and upon opening said switch a large amplitude voltage pulse is impressed upon said starting electrode to start discharge of said direct voltage through said lamp.

2. Flash lamp apparatus comprising a flash lamp having a pair of principal electrodes and a starting electrode, in combination with circuit means for igniting and flashing said lamp, said circuit means comprising a pulse generator circuit adapted to produce high-voltage periodic pulses, the output circuit of said pulse generator including a series connection of a rectifier, a switch and a condenser, said condenser being connected across said principal electrodes, means connected with said condenser for limiting its voltage to a value incapable of initiating discharge between said pricipal electrodes, means responsive to opening said switch for impressing the full intensity of said pulses between said starting electrode and one of said principal electrodes to initiate discharge in said flash lamp, whereby said condenser thereupon discharges through said flash lamp to produce a high-intensity light pulse thereby.

JULIUS FUTTERMAN.

REFERENCES CITED

The following references are of record in the file of this patent:

UNITED STATES PATENTS

| Number | Name | Date |
| --- | --- | --- |
| 1,442,781 | Nichols | Jan. 16, 1923 |
| 1,587,520 | Hartley | June 8, 1926 |
| 2,212,202 | Faudell et al. | Aug. 20, 1940 |
| 2,218,764 | Moller et al. | Oct. 22, 1940 |
| 2,227,075 | Geiger | Dec. 31, 1940 |